(12) United States Patent
Pandey et al.

(10) Patent No.: US 9,843,965 B2
(45) Date of Patent: *Dec. 12, 2017

(54) ADJUSTING NUMBER OF DISCOVERY FRAMES SENT BASED ON ACCESS POINT DEPLOYMENT

(71) Applicant: Cisco Technology, Inc., San Jose, CA (US)

(72) Inventors: Santosh Pandey, Newark, CA (US); Andrew Myles, Turramurra (AU)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/174,399

(22) Filed: Jun. 6, 2016

(65) Prior Publication Data

US 2016/0286436 A1    Sep. 29, 2016

Related U.S. Application Data

(63) Continuation of application No. 14/101,537, filed on Dec. 10, 2013, now Pat. No. 9,380,517.

(51) Int. Cl.
*H04W 28/22* (2009.01)
*H04W 16/10* (2009.01)
*H04W 24/08* (2009.01)
*H04W 48/12* (2009.01)
*H04W 48/16* (2009.01)
*H04W 88/08* (2009.01)
*H04W 84/12* (2009.01)

(52) U.S. Cl.
CPC ........... *H04W 28/22* (2013.01); *H04W 16/10* (2013.01); *H04W 24/08* (2013.01); *H04W 48/12* (2013.01); *H04W 48/16* (2013.01); *H04W 84/12* (2013.01); *H04W 88/08* (2013.01)

(58) Field of Classification Search
None
See application file for complete search history.

(56) References Cited

U.S. PATENT DOCUMENTS

| 6,112,104 | A | 8/2000 | Saario et al. |
| 2005/0249173 | A1 | 11/2005 | Salokannel et al. |
| 2006/0233128 | A1 | 10/2006 | Sood et al. |
| 2008/0107089 | A1* | 5/2008 | Larsson ............... H04L 45/26 370/338 |
| 2011/0199898 | A1 | 8/2011 | Cho et al. |

(Continued)

OTHER PUBLICATIONS

IEEE Standards Association, "Standard Group MAC Addresses: A Tutorial Guide," retrieved from http://standards.ieee.org/develop/regauth/tut/macgrp.pdf, on Dec. 9, 2013, 4 pages.

(Continued)

*Primary Examiner* — Gary Mui
(74) *Attorney, Agent, or Firm* — Edell, Shapiro & Finnan, LLC

(57) ABSTRACT

Techniques are provided for determining, for at least one wireless access point in a wireless network, a number of first-time associations created with one or more wireless client devices in the wireless network. Based upon the determined number of first-time associations created, the number of discovery frames to be sent by the at least one wireless access point may be adjusted.

20 Claims, 5 Drawing Sheets

(56) References Cited

U.S. PATENT DOCUMENTS

| | | |
|---|---|---|
| 2013/0044596 A1 | 2/2013 | Zhi et al. |
| 2013/0080650 A1 | 3/2013 | Cherian |
| 2013/0111044 A1 | 5/2013 | Cherian et al. |
| 2013/0176897 A1 | 7/2013 | Wang et al. |
| 2013/0177002 A1 | 7/2013 | Sun et al. |
| 2013/0235813 A1 | 9/2013 | Segev et al. |
| 2014/0010223 A1 | 1/2014 | Wang et al. |
| 2015/0036594 A1 | 2/2015 | Kneckt et al. |
| 2015/0163723 A1 | 6/2015 | Pandey et al. |

OTHER PUBLICATIONS

Abraham, et al., "FILS IP address Setup Proposal Text," IEEE P802.11 Wireless LANs, IEEE 802.11-13/0040r10, Mar. 18, 2013, retrieved from http://www.ieee802.org/11/Reports/tgai_update.htm, 13 pages.

* cited by examiner

ADJUSTING NUMBER OF DISCOVERY FRAMES SENT BASED ON ACCESS POINT DEPLOYMENT

CROSS-REFERENCE TO RELATED APPLICATIONS

This application is a continuation of U.S. patent application Ser. No. 14/101,537, filed Dec. 10, 2013, the entire contents of which is incorporated herein by reference.

TECHNICAL FIELD

The present disclosure relates to the optimization of wireless access point behavior in wireless networks.

BACKGROUND

Certain wireless network architectures include one or more wireless access points (AP). Access points are specially configured nodes that allow wireless client devices to connect to a wired network (e.g., local area network) using a wireless communication standard, such as Institute of Electrical and Electronics Engineers (IEEE) 802.11 (known commercially as Wi-Fi™). The access points function as a central transmitter and receiver of radio signals and typically connect to a router (via a wired network). Each access point in a deployment can relay data between the wireless client devices (such as computers, printers and mobile handset devices) and devices on the wired network.

DESCRIPTION OF EXAMPLE EMBODIMENTS

Overview

Techniques are presented herein for determining, for at least one wireless access point in a wireless network, a number of first-time associations created with one or more wireless client devices in the wireless network. Based upon the determined number of first-time associations created, the number of discovery frames to be sent by the at least one wireless access point may be adjusted.

Example Embodiments

Figure 1:
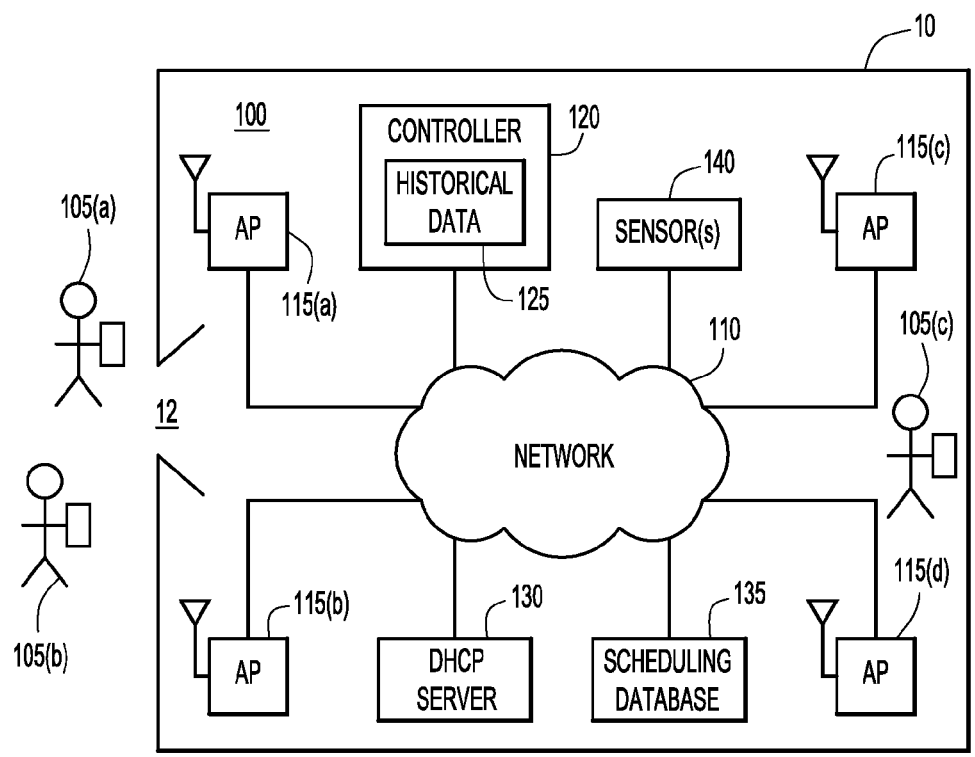
FIG. 1 is a block diagram of an example wireless network in which wireless access point behavior may be adjusted and optimized according to techniques presented herein.

FIG. 1 is a block diagram illustrating the architecture of a wireless network 100 in a site or venue 10 such as a building, train station, airport, etc., that connects wireless client devices 105(*a*)-105(*c*) to a network 110 via one or more wireless access points (AP) 115(*a*)-115(*d*). The site 10 includes an egress/ingress area shown at reference numeral 12, the importance of which is described in more detail hereinafter. Network 110 may be a wired local area network (LAN), or wide area network (WAN), to which APs 115(*a*)-115(*d*) are connected. Any of the APs 115(*a*)-115(*d*) may communicate with any of the wireless client devices 105(*a*)-105(*c*) at any given time. However, as described hereinafter, a wireless client device "associates" with an AP, and can associate to only one AP at a time. Each AP 115(1)-115(*b*) is also connected via network 110 to a controller 120 (also known as a wireless network controller), which may be hardware or software-based.

Access points 115(*a*)-115(*d*) are devices that allow the wireless client devices 105(*a*)-105(*c*) to connect to network 110 using a wireless communication standard or protocol, such as IEEE 802.11 (Wi-Fi™) or any other suitable wireless communication standard now known or hereinafter developed. The APs 115(*a*)-115(*d*) may also connect to one or more routers and switches to access the Internet and other networks (not shown in FIG. 1). Client devices 105(*a*)-105(*c*) may be computers (e.g., desktops, laptops, or tablets), mobile devices (e.g., mobile phones, personal digital assistants (PDAs), or navigation units), peripheral devices (e.g., printers, scanners, fax machines, or copiers), etc.

Controller 120 is a device (i.e., computer, server, etc.) that, in certain circumstances, is configured to control the operation of APs 115(*a*)-115(*d*) and perform the techniques presented herein. In the example of FIG. 1, controller 120 includes a historical data module 125. Historical data module 125 is a data store that records and logs analytics about the behavior of APs 115(*a*)-115(*d*), including recording parameters associated with the APs and their values, and information regarding interactions with wireless client devices such as the number of new associations with client devices (current and past), number of re-associations with client devices (current and past), etc.

Scheduling database 135 is a data store (i.e. on a computer, server, database or flat file(s) on a server, etc.) that stores information about expected future events that may cause an increase in the number of wireless client devices requesting first-time associations at one or more APs. For example, the venue 10 may be a train station, and a train arrival at the train station may cause/result in a significant increase in requests for first-time associations by clients at particular APs depending on their location in the venue 10, i.e., relative to an egress/ingress area 12 or relatively to other locations in the venue where bursts of people may be passing through on a scheduled or other basis. First-time associations are both true first-time associations between an AP and a wireless client device, and when a wireless client device ends a first session and creates a second session, thereby creating another first-time association. First-time associations can be contrasted with re-associations, which include a wireless client device in a given session roaming and re-associating from a first AP to a second AP. Events may be correlated and associated with the affected one or more APs. Scheduling data may also include information about holiday or special events, rush-hour or other future expected increases in traffic on the network, and expected increases in requests for first-time associations.

Sensor data from one or more sensors 140 may also provide input to the controller 120, APs 115(*a*)-115(*d*), etc. related to ongoing events in the venue 10. The sensor data may be collected from one or more sensors and stored (i.e. on a computer, server, database or flat file(s) on a server etc.). The sensor data may include audio, video, electrical, electromagnetic, or other forms of sensory data collection. For example, while the scheduling database 135 may contain an entry indicating that a train is expected to arrive at 1:30 PM, an audio sensor may detect that a train has arrived early at 1:15 PM. The sensor may also be further up the track, for example a mile or more outside of the facility, and therefore be able to indicate that a train will arrive early or otherwise off-schedule. The sensor data may be provided to devices via network 110, including the controller 120, which may consequentially configure and optimize AP parameters according to techniques presented herein.

When a new association is requested by a wireless client device to a specific AP, the AP will try to reserve bandwidth before accepting responsibility for processing the traffic stream. The AP may also reject the new traffic stream for a wireless client device, for example because a certain quality of service (QoS) cannot be guaranteed or when the number of wireless client devices associated with the AP would exceed a predetermined number. When a wireless client device associates with a given AP, the AP or the controller 120 may request an Internet Protocol (IP) address to assign to the wireless client device from a Dynamic Host Configuration Protocol (DHCP) server 130. The acquired IP address is used as a unique identifier for the wireless client device on the network 110.

Once a wireless client device is associated with a given access point, the user may move through a facility or building such as train station, airport, etc., and the signal strength may diminish. As a result, the wireless client device may need to re-associate with a new access point. For example, a user carrying wireless client device 105(*a*) associated with AP 115(*a*) may move to a point where the signal strength with AP 115(*a*) becomes low, but the signal strength of AP 115(*c*) becomes stronger, so the wireless client device 105(*a*) may re-associate to AP 115(*c*). The re-association allows the wireless client device to maintain the same IP address, so there is less management traffic overhead associated with a re-association when compared with a first-time association.

The process of associating wireless client devices with APs for the first time is time consuming. The IEEE 802.11ai standard is aimed towards a Fast Initial Link Setup (FILS) procedure that can greatly reduce the amount of time required for a wireless client device to discover an AP, associate to it, and obtain an IP address to start a data transaction. Decreasing the time to associate comes with some overhead in terms of data packets and processing. For example, a FILS-enabled AP may send beacon-like frames called FILS discovery frames (or discovery frames/packets, 802.11ai overhead messages) in order for the wireless client device to find the AP faster and begin the association process. The wireless client device may also need to be FILS-enabled to recognize the FILS discovery frames and initiate the association. FILS-enabled wireless client devices may also be called FILS stations or FILS STAs. If FILS capability is not available on the AP or the wireless client device, the wireless client device may discover the APs to create an association by sending out a probe request to discover nearby APs or by passively listening for any AP beacon frames. This is more time consuming. FILS discovery frames may not need to be sent for re-associating a wireless client device with an AP, only for the first-time association. Thus, if a given AP rarely creates new associations with wireless client devices, the discovery frames sent out are purely management traffic overhead. This management traffic overhead can congest the channel and use up bandwidth that would otherwise be available for data traffic.

In a facility such as an airport or train station, a small number of APs may perform a large portion of first-time associations. For example, new associations may mostly be created at ingress/egress points such as entrances and exits, in waiting areas, or where passengers from trains or planes arrive, etc. Conversely, APs in the interior of the facility may rarely create first-time associations, being more likely to accept re-associations from roaming wireless client devices that had been associated with neighboring APs in the wireless network 100.

Thus, to minimize management traffic overhead, it would be advantageous to send discovery frames at APs where a large number of first-time associations occur, while fewer and possibly no discovery frames should be sent where first-time associations rarely occur. The number of discovery frames sent may be scaled for each AP, either by the AP itself or by the controller, based upon the number of first-time associations performed at each AP in the past, and projected first-time associations to be performed in the future, according to techniques presented herein.

Figure 2:
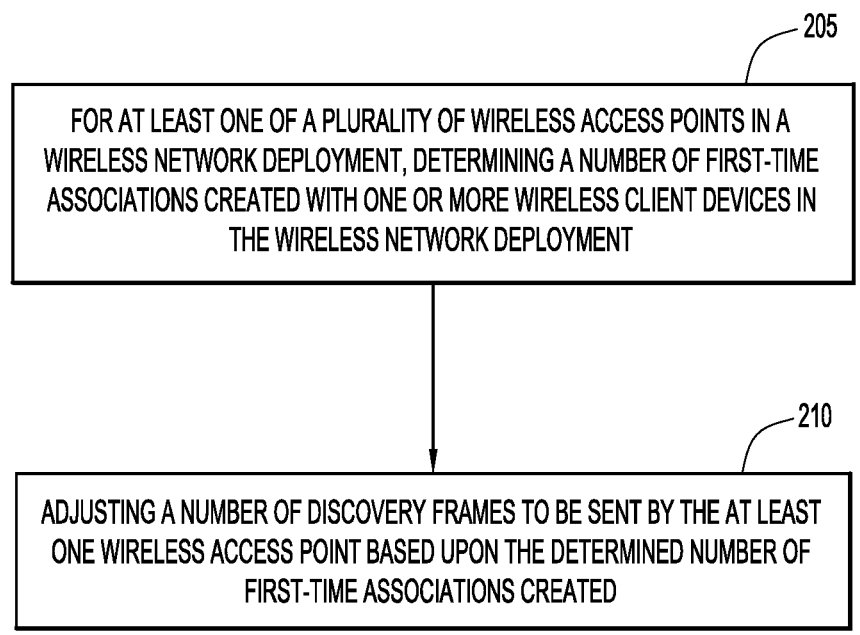
FIG. 2 is a flowchart generally illustrating a method for adjusting wireless access point behavior based on a number of first-time associations created with wireless client devices.

FIG. 2 shows a flowchart generally depicting the operations for adjusting wireless AP behavior based upon a number of first-time associations created with wireless client devices. Reference is also made to FIG. 1 in connection with this description of FIG. 2. At step 205, the number of first-time associations created with one or more wireless client devices in the wireless network deployment is determined for at least one of a plurality of wireless APs. At step 210, the number of discovery frames to be sent by the at least one wireless AP is adjusted based upon the determined number of first-time associations created.

APs of interest may be determined in order to limit the number of APs which are actively managed, adjusted and optimized based upon the past and expected number of first-time associations. APs of interest are the subset of APs with a disproportionate, greater, or plurality of past or expected first-time associations with wireless client devices within a facility or deployment. Often the APs of interest are on the perimeter of a facility, near waiting rooms, or near ingress and egress areas. APs of interest may change regularly as events occur in different areas of a facility.

There are many ways to determine APs of interest. A first technique may simply designate a predetermined number or predetermined percentage of APs in a deployment that historically has the largest number of first-time associations. For example, the controller 120 may consult the historical data 125 over a predetermined time period to determine the APs with the greatest number of first-time associations. A similar time period on another day, month, or year may also be considered. For example, during morning rush-hour at a facility, APs of interest may be designated based upon the APs with the greatest number of first-time associations during rush-hour the previous day. More simply, the APs of interest may simply be the subset of APs with the greatest proportion of first-time associations in the past few minutes or seconds.

Statistical techniques may also be used to determine the APs of interest. For example, for each AP in a deployment, the number of new first-time associations (not re-associations) carried out over a predetermined period of time, such as T seconds, may be determined. The median number of first-time associations for APs in the deployment may then be determined, as well as the median absolute deviation (MAD) for each AP. The APs of interest may be selected as the subset of APs which have a number of associations greater than a predetermined number of MADs from the median (the ratio or difference between the MAD and median to be considered an AP of interest may vary). Alternatively, the mean number of first-time associations for APs in the deployment may be determined, as well as the standard deviation (SD) for each AP. The APs of interest may be selected as the subset of APs which have a number of associations greater than a predetermined of SDs from the mean. Other similar statistical techniques are within the scope of techniques presented herein. Mean, median and mode, etc. are examples of measures of central tendency (MCT). This algorithm to choose a subset of APs of interest may be re-run every predetermined time period, such as every T seconds, or when triggered to re-run, for example after receiving an external sensor event. The time period T may be any period that fits the deployment. Its value depends on how dynamically the relevant FILS parameter (e.g. discovery frames) should be adapted, and the computation required to determine the APs of interest. As a result, the subset of APs that are actively managed and optimized using techniques presented herein may change often throughout a given day.

Figure 3:
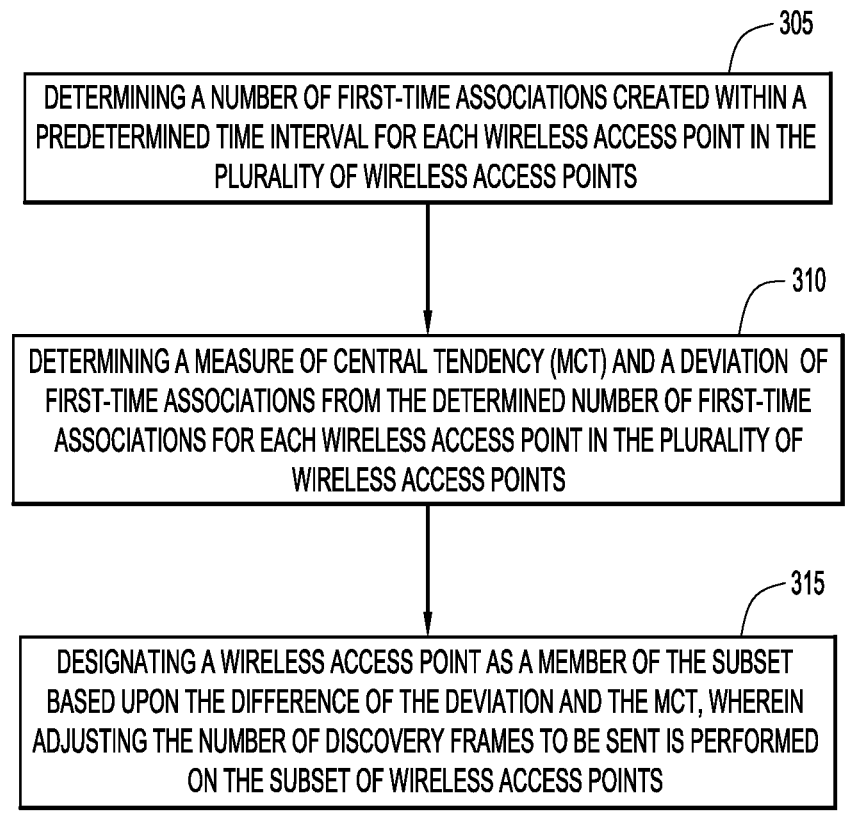
FIG. 3 is a flowchart illustrating operations for adjusting wireless access point behavior for a subset of APs that serve a greater number of first-time associations.

As an example, FIG. 3 is a flowchart illustrating a method for adjusting wireless access point behavior for a subset of APs that serve a greater number of first-time associations. At step 305, a number of first-time associations created within a predetermined time interval for each wireless access point in a plurality of wireless access points are determined. At step 310, the measure of central tendency (MCT) and deviation of first-time associations from the determined number of first-time associations for each wireless access point in the plurality of wireless access points is determined. At step 315, a wireless access point is designated as a member of a subset based upon the difference of the deviation and the MCT, wherein adjusting the number of discovery frames to be sent is performed on the subset of wireless access points.

Statistical techniques may also be used to optimize FILS parameters, such as number of discovery frames sent over a time period T. For example, the periodicity of sending discovery frames for a given AP may be set as a function of the MAD of the AP's first-time associations with respect (as compared to or as a ratio) to the median number of first-time associations. The periodicity calculations may be performed on either the APs of interest, or any or all APs in the deployment. The periodicity calculation may also be a pure function of the number of associations in time period T for a given AP. As a result, discovery frames will be sent more frequently by the APs with a larger number of first-time associations, either historically or as expected based upon data from the scheduling database 135 or sensor data 140. As an example for a given discovery frame frequency, also known as the beacon interval (BI):

$$T(\text{in milliseconds}) = \text{round}(\max(BI, \min(20, (BI/MAD \text{ from median}))))$$

This equation will limit T (the new calculated rate to send discovery frames) between a range of 20 milliseconds and the BI, wherein the BI is any predetermined time value, but is typically lower than the default rate of sending discovery frames for the APs of interest subset. While 20 milliseconds are used as an example, the minimum could be any suitable amount of time.

Another optimization that may be performed on the determined APs of interest subset, or on any or all APs in the deployment, is with respect to pre-committed IP addresses. When a wireless client device associates with an AP, the AP requests an IP address from the DHCP server 130. The IP address is used as a unique identifier on the network 110, and enables data communication for the wireless client device. However, acquiring an IP address from the DHCP server takes time, and is the cause of significant delays when creating a first-time association. Each AP may instead pre-commit IP addresses from the DHCP server. Each AP may store/cache a number of pre-committed IP addresses ready to use for any wireless client device requesting a first-time association. As a result, the first-time association can occur much faster without contacting the DHCP server. The number of pre-committed IP addresses may be set as a predetermined number for each AP. Alternatively, the APs of interest subset may be given a higher predetermined number of pre-committed IP addresses, while the remaining APs in the deployment have fewer or none. As still another alternative, the number of pre-committed IP addresses held at each AP or AP of interest may be a function of the MAD value of the respective AP with respect to the median number of first-time associations created historically or expected to be created based upon scheduled events in the scheduling database or sensor data.

The above techniques may require that the wireless client devices are FILS compatible. For example, FILS discovery frame usage requires a FILS-compatible wireless client device. However, the techniques above may also take into consideration the proportion of wireless client devices that are in fact FILS-compatible. For example, if a given AP has wireless client devices creating first-time associations over a certain period, but the rate or absolute number of FILS-compatible devices is below a predetermined threshold, the AP may reduce or discontinue sending discovery frames. When a wireless client device is creating a first-time association with an AP in a deployment, it may send a probe request packet. The probe request typically contains one or more bits indicating whether the wireless client device is FILS compatible. Thus, even if the sending of discovery frames from a given AP has been reduced or stopped, discovery frames may be increased or restarted in response to the monitored rates of FILS compatibility from the probe requests, and the volume of first-time association requests as discussed above.

The optimization of FILS parameters, such as the discovery frame rate, may also be based upon the AP load. For example, if a given AP has more than fifty or some other predetermined number of wireless client devices associated to it, the AP may stop sending discovery frames altogether. Discovery frame periodicity may also be reduced proportionally based upon the number of associated wireless client devices.

Many of the techniques discussed above may also be practiced, not just based on historical data of first-time associations, but based upon an imminent predicted increase or decrease in the number of first-time associations. For example, the scheduling database 135 may contain data of a train schedule and/or other events which may indicate the timing of a significant influx of users with wireless client devices. FILS parameter optimizations, such as discovery frame sending and IP pre-committals, may be adjusted based upon the expected event(s). For example, if a train is scheduled to arrive imminently or within some predetermined time period, the APs nearest to the areas where passengers enter/leave the train station may increase the frequency of discovery frames sent, the number of pre-committed IP addresses acquired, etc. The controller and/or APs may also receive sensor data from the sensor(s) 140 related to events that may or may not be scheduled. For example, a train may come into the station earlier than scheduled. FILS parameters may be adjusted and optimized for affected APs (APs expected to experience a change in first-time association requests) even though the event was unscheduled.

Figure 4:
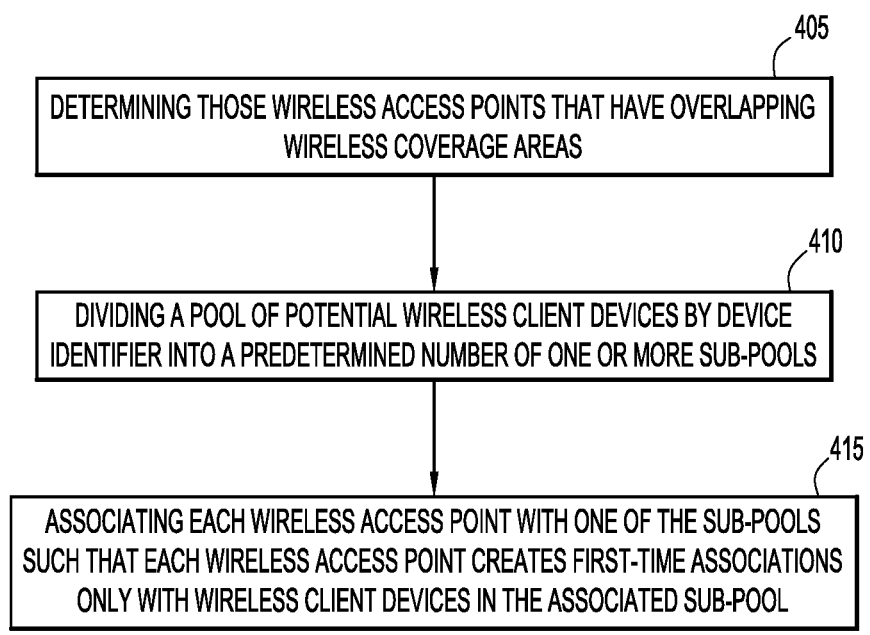
FIG. 4 is a flowchart illustrating operations for dividing a pool of potential wireless client devices by device identifier.

FIG. 4 is a flow chart illustrating a method for dividing a pool of potential wireless client devices by device identifier, which is now described with reference to FIG. 1. In a wireless deployment, such as at the venue 10, there may be time periods of high volumes of first-time association requests. There also may be areas within a given deployment where multiple APs provide wireless coverage. For example, in FIG. 1 APs 115(a) and 115(b) both provide coverage for the ingress point 12 accessed by users with wireless client devices 105(a) and 105(b). APs with overlapping coverage areas may perform differentiated link setup, which allows APs to do admission control based upon a unique identifier of the wireless client device, such as the Media Access Control (MAC) address. The set of possible MAC addresses may be considered a pool of potential wireless access clients that may request first-time associations with any of the APs. In areas with overlapping coverage, either a controller or the APs themselves may divide the pool into at least two sub-pools, where each AP will create associations with wireless client devices in one of the sub-pools. For example, if there are two overlapping APs with greater than −67 decibels relative to a milliwatt (dBm) coverage (the acceptable dBm may be predetermined and may vary), with acceptable Voice-over-IP (VoIP) support. One AP may accept first-time associations only with even-numbered MAC addresses, while the other AP may accept first-time associations only with odd-numbered MAC addresses. In this manner, the potential pool of MAC addresses is divided into two sub-pools, even and odd. This is a fast solution computationally, because only the last bit in the MAC address needs to be checked by each given AP to determine if the wireless client device is an acceptable candidate for a first-time association. Similarly, the pool of possible MAC addresses may be divided into three or more sub-pools for three or more overlapping APs, etc. A second order parameter may consider user mobility to determine the possible division of client MAC address space. For example, if users typically go from a first area to a second area, but not to a third area, this is the user mobility pattern. The client MAC address space may therefore be divided in the first area and second area, but not the third area. The third area may have its own MAC address space, or share it with a fourth area, etc. The user mobility can be determined by a mobility services function that runs on the wireless controller or in a separate apparatus. Wireless client devices attempting and failing to associate with a certain AP create some additional management traffic overhead, but overall evenly distributing channel load across overlapping APs improves the efficiency of the deployment. For example, if one of two overlapping APs is slightly closer to an ingress point such as an entrance door, all or nearly all wireless client devices may attempt to associate with the slightly closer AP, causing the closer AP to quickly become overloaded. Differentiated link setup helps balance the load in these scenarios. In one technique, differentiated link setup is only performed on the APs of interest subset (APs with the greatest number of first-time associations).

A technique of practicing differentiated link setup is depicted in the flowchart of FIG. 4. At step 405, wireless access points having overlapping wireless coverage areas are determined. At step 410, a pool of potential wireless clients is divided by device identifier into a predetermined number of one or more sub-pools. At step 415, each wireless access point is associated with one of the sub-pools such that each wireless access point creates first-time associations only with wireless client devices in an associated sub-pool.

When wireless client devices are associated with a given AP, the AP may provide a neighbor report. The neighbor report indicates one or more AP neighbors with channel numbers (frequency) and may list the next time a discovery frame will be sent by these neighbors. This makes re-associations by the wireless client device from one AP to another more efficient. However, neighboring APs may also engage in differentiated link setup according to techniques presented herein. An AP may therefore provide a censored or reduced neighbor report that removes any APs that would not associate the wireless client device. For example, if the MAC address of the wireless client device is even, the associated AP will remove any APs which only associate with odd-numbered MAC addresses from the neighbor report.

Figure 5:
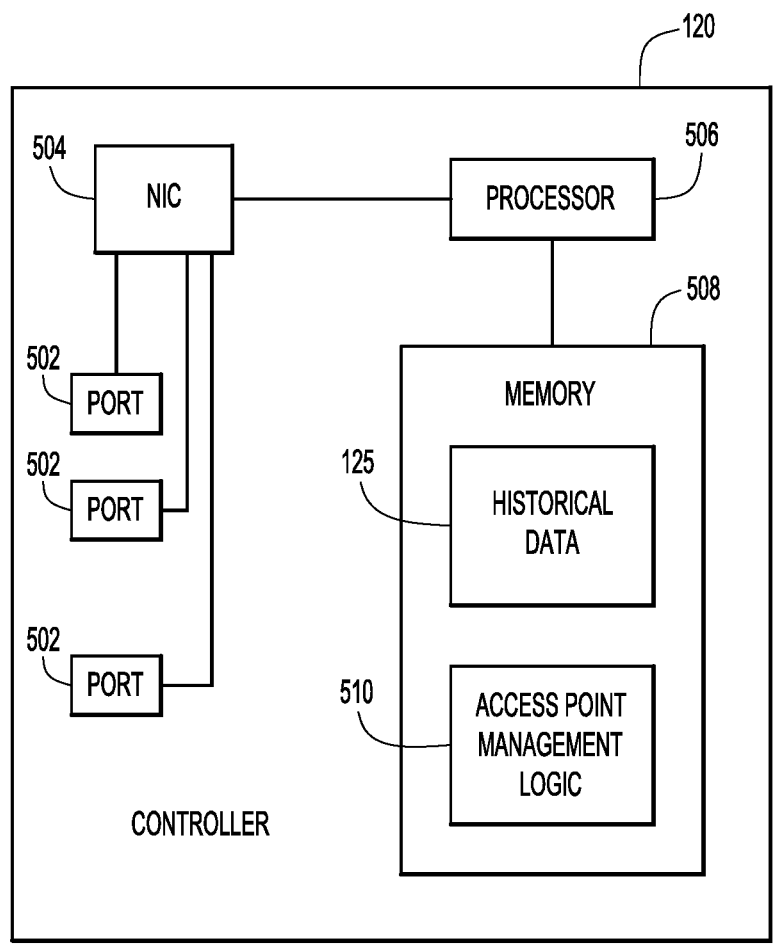
FIG. 5 is an example block diagram of a controller configured to perform the techniques presented herein.

FIG. 5 is a block diagram illustrating further details of controller 120 of FIG. 1 which may execute the techniques presented herein. Controller 120 comprises a plurality of network ports 502, a network interface card (NIC) 504, a processor 506, and a memory 508. Memory 508 comprises the aforementioned historical data 125 and access point management logic 510. While historical data 125, scheduling data contained in scheduling database 135 (FIG. 1), and sensor data from one or more sensor(s) 140 are depicted as either on or off of the controller 120, all of this data may be retained either in the memory 508 of the controller 120 or in memory of the APs 115(a)-115(d), or external to and accessible by the controller 120 and APs 115(a)-115(d).

Memory 508 may comprise read only memory (ROM), random access memory (RAM), magnetic disk storage media devices, optical storage media devices, flash memory devices, electrical, optical, or other physical/tangible (non-transitory) memory storage devices. The processor 506 is, for example, a microprocessor or microcontroller that executes instructions for the access point management logic 510. Thus, in general, the memory 508 may comprise one or more tangible computer readable storage media (e.g., a memory device) encoded with software comprising computer executable instructions for the access point management logic 510 and when the software is executed (by the processor 506) it is operable to perform the operations described herein in connection with FIGS. 1-4.

FIG. 5 illustrates an example in which the access point management techniques are implemented on a controller 120. It would be appreciated that, in an alternative arrangement, the techniques may be implemented on an access point, such as access point 115(a) of FIG. 1. In such an example, the access point 115(a) would include a processor, memory and historical data and access point management logic, as described above.

The access point management techniques described herein may provide one or more advantages over conventional arrangements. By optimizing parameters such as discovery frames and the number of pre-committed IP addresses, the amount of management traffic overhead may be significantly reduced. Differentiated link setup allows for a more efficient distribution of association load.

In summary, a method is provided comprising, for at least one of a plurality of wireless access points in a wireless network, determining a number of first-time associations created with one or more wireless client devices in the wireless network, and adjusting a number of discovery frames to be sent by the at least one wireless access point based upon the determined number of first-time associations created.

An apparatus is also provided comprising a network interface unit configured to communicate over a network with a plurality of wireless access points that are capable of operating in a frequency channel of a wireless network; and a processor coupled to the network interface unit, and configured to: for at least one of the plurality of wireless access points in the wireless network, determine a number of first-time associations created with one or more wireless client devices in the wireless network deployment; and adjust a number of discovery frames to be sent by the at least one wireless access point based upon the determined number of first-time associations created.

In addition, a computer-readable storage media is provided that is encoded with software comprising computer executable instructions and when the software is executed operable to: for at least one of the plurality of wireless access points in the wireless network, determine a number of first-time associations created with one or more wireless client devices in the wireless network; and adjust a number of discovery frames to be sent by the at least one wireless access point based upon the determined number of first-time associations created.

The above description is intended by way of example only. Various modifications and structural changes may be made therein without departing from the scope of the concepts described herein and within the scope and range of equivalents of the claims.

What is claimed is:

1. A method comprising:
   determining a median absolute deviation of first time associations for a particular wireless access point of a plurality of wireless access points configured to provide access to a wireless network;
   determining a median number of first time associations for the plurality of wireless access points; and
   altering a transmission rate of discovery frames for the particular wireless access point based upon the median absolute deviation and the median number of first time associations.

2. The method of claim 1, wherein altering the transmission rate of discovery frames comprises altering the transmission rate of discovery frames based upon a difference between the median absolute deviation and the median number of first time associations.

3. The method of claim 1, further comprising selecting the particular wireless access point of the plurality of wireless access points based upon the particular wireless access point receiving a number of first time associations that is greater than a predetermined value,
   wherein determining the median absolute deviation of first time associations for the particular wireless access point comprises determining the median absolute deviation of first time associations for the particular wireless access point in response to the selecting of the particular wireless access point.

4. The method of claim 1, further comprising:
   determining a number of standard deviations of first time associations for the particular wireless access point from the median number of first time associations for the plurality of wireless access points;
   determining the number of standard deviations is greater than a predetermined value; and
   altering the transmission rate in response to determining the number of standard deviations is greater than the predetermined value.

5. The method of claim 1, further comprising:
   determining that the number of first time associations for the particular wireless access point is greater than a predetermined number of median absolute deviations from the median number of first time associations for the plurality of wireless access points; and
   altering the transmission rate in response to determining the that the number of first time associations for the particular wireless access point is greater than the predetermined number of median absolute deviations from the median number of first time associations for the plurality of wireless access points.

6. The method of claim 1, further comprising:
   generating data associating the altering of the transmission rate of discovery frames with a recurring temporal event; and
   storing the data in a database.

7. The method if claim 6, further comprising:
   tracking the data in the database to determine a recurrence of the temporal event; and
   re-altering the transmission rate of discovery frames in response to recurrence of the temporal event.

8. An apparatus comprising:
   a network interface unit configured to communicate with a plurality of wireless access points that are capable of operating in a frequency channel of a wireless network; and
   a processor coupled to the network interface unit, and configured to:
      determine a median absolute deviation of first time associations for a particular wireless access point of the plurality of wireless access points configured to provide access to the wireless network;
      determine a median number of first time associations for the plurality of wireless access points; and
      alter a transmission rate of discovery frames for the particular wireless access point based upon the median absolute deviation and the median number of first time associations.

9. The apparatus of claim 8, wherein the processor is configured to alter the transmission rate of discovery frames by altering the transmission rate of discovery frames based upon a difference between the median absolute deviation and the median number of first time associations.

10. The apparatus of claim 8, wherein the processor is further configured to select the particular wireless access point of the plurality of wireless access points based upon the wireless access point receiving a number of first time associations that is greater than a predetermined value,
    wherein the processor is configured to determine the median absolute deviation of first time associations for the particular wireless access point by determining the median absolute deviation of first time associations for the wireless access point in response to the selecting of the particular wireless access point.

11. The apparatus of claim 8, wherein the processor is further configured to:
    determine a number of standard deviations of first time associations for the particular wireless access point from the median number of first time associations for the plurality of wireless access points;
    determine the number of standard deviations is greater than a predetermined value; and
    alter the transmission rate in response to determining the number of standard deviations is greater than the predetermined value.

12. The apparatus of claim 8, wherein the processor is further configured to:

determine that the number of first time associations for the particular wireless access point is greater than a predetermined number of median absolute deviations from the median number of first time associations for the plurality of wireless access points; and alter the transmission rate in response to determining the that the number of first time associations for the particular wireless access point is greater than the predetermined number of median absolute deviations from the median number of first time associations for the plurality of wireless access points.

13. The apparatus of claim 8, further comprising a database, wherein the processor is further configured to:
generate data associating the altering of the transmission rate of discovery frames with a recurring temporal event; and
store the data in a database.

14. The apparatus of claim 13, wherein the processor is further configured to:
track the data in the database to determine a recurrence of the temporal event; and
re-alter the transmission rate of discovery frames with the recurrence of the temporal event.

15. A non-transitory computer-readable storage media encoded with software comprising computer executable instructions and when the software is executed operable to:
determine a median absolute deviation of first time associations for a particular wireless access point of a plurality of wireless access points configured to provide access to a wireless network;
determine a median number of first time associations for the plurality of wireless access points; and
alter a transmission rate of discovery frames for the particular wireless access point based upon the median absolute deviation and the median number of first time associations.

16. The non-transitory computer-readable storage media of claim 15, wherein the instructions operable to alter the transmission rate of discovery frames comprise instructions operable to alter the transmission rate of discovery frames based upon a difference between the median absolute deviation and the median number of first time associations.

17. The non-transitory computer-readable storage media of claim 15, further comprising instructions operable to:
select the particular wireless access point of the plurality of wireless access points based upon the particular wireless access point receiving a number of first time associations that is greater than a predetermined value,
wherein the instructions operable to determine the median absolute deviation of first time associations for the wireless access point comprise instructions operable to determine the median absolute deviation of first time associations for the particular wireless access point in response to the selecting of the wireless access point.

18. The non-transitory computer-readable storage media of claim 15, further comprising instructions operable to:
determine a number of standard deviations of first time associations for the particular wireless access point from the median number of first time associations for the plurality of wireless access points;
determine the number of standard deviations is greater than a predetermined value; and
alter the transmission rate in response to determining the number of standard deviations is greater than the predetermined value.

19. The non-transitory computer-readable storage media of claim 15, further comprising instructions operable to:
determine that the number of first time associations for the particular wireless access point is greater than a predetermined number of median absolute deviations from the median number of first time associations for the plurality of wireless access points; and
alter the transmission rate in response to determining the that the number of first time associations for the particular wireless access point is greater than the predetermined number of median absolute deviations from the median number of first time associations for the plurality of wireless access points.

20. The non-transitory computer-readable storage media of claim 15, further comprising instructions operable to:
generate data associating the altering of the transmission rate of discovery frames with a recurring temporal event;
store the data in a database;
track the data in the database to determine a recurrence of the temporal event; and
re-alter the transmission rate of discovery frames with recurrence of the temporal event.

* * * * *